United States Patent Office

2,845,465
Patented July 29, 1958

2,845,465

PREPARATION OF OXO ALCOHOLS USING ZINC ACETYLACETONATE AS PROMOTER

Neville L. Cull, Baker, and Clyde L. Aldridge and Joseph K. Mertzweiller, Baton Rouge, La., assignors to Esso Research and Engineering Company, a corporation of Delaware No Drawing. Application March 10, 1954
Serial No. 415,428

5 Claims. (Cl. 260—635)

The present invention relates to the preparation of oxygenated compounds by the reaction of hydrogen and carbon monoxide with olefinic hydrocarbons in the presence of carbonylation catalysts. More specifically, the present invention relates to the preparation of high molecular weight alcohols and glycols by this process.

The carbonylation, or aldehyde synthesis reaction, better known as the Oxo reaction, is now a well known process, and provides a ready means for preparing aldehydes and alcohols from compounds containing olefinic unsaturation. In accordance with that reaction, olefins, $H_2$ and CO are reacted in the presence of a carbonylation catalyst, such as cobalt carbonyl, which in turn may be derived from any form of cobalt carbonylation reaction conditions which include temperatures of from about 200–400° F. and pressures of from about 1500–4500 p. s. i. g. Under these conditions, one mole of hydrogen and one of CO add to the olefinic linkage to produce a mole of an aldehyde having one more carbon atom than the corresponding olefin. The aldehyde product, contaminated with cobalt carbonyl catalyst, is thereafter thermally treated in the presence of an inert gas, steam, water, dilute acid, or other means to free it of dissolved catalyst, and the product is then hydrogenated to the corresponding alcohol.

The synthesis process thus briefly described affords a ready means for preparing alcohols from a wide variety of olefins, for most olefins, if they are not too highly branched, may be subjected to this reaction, with yields varying depending upon the nature of the olefin.

A serious drawback of this process becomes apparent when it is attempted to prepare higher molecular weight alcohols from high molecular weight olefins, particularly if these are highly branched. It has been found that while there is not much difference in carbonylation rates between straight and branch chained olefins of relatively low molecular weight, such as those having less than 10 carbon atoms, yet increasing the number of carbon atoms is accompanied by increasing difficulty in carbonylation, in particular when the chains are branched. Thus it has been found that above 12 carbon atoms, the rate of carbonylation of highly branched chained olefins, is too slow and the yields too poor for commercially practicable operation to produce aldehydes and alcohols. Furthermore, the availability of higher molecular weight olefins is quite limited. Cracking of waxes and petrolatum furnishes a mixture of straight chain olefins of varying molecular weight, but this is an expensive method of preparation; separation of the individual olefins is very difficult and costly. Polymerization of low molecular weight olefins, such as propylene and/or butylenes, forms highly branched olefins, the respective fractions of which result in diminishing alcohol yields with increase in polymer units. Thus the alcohol yield decreases from about 70% with the $C_6$ fraction to 50% with $C_9$ and less than 30% with $C_{15}$.

It is, therefore, an object of the present invention to set forth a process for preparing good yields of higher alcohols from olefins by the carbonylation or Oxo reaction.

It is also a purpose of the present invention to prepare higher alcohols in good yields from relatively low molecular weight olefins by this reaction.

It is a still further object of the present invention to set forth a process for preparing glycols from relatively low molecular weight olefins by the alcohol synthesis reaction.

Other and further objects and advantages of the present invention will become clear hereinafter.

It has been found that when certain elements and salts of group II are added as promoters to the carbonylation reaction, there is recovered, beside the aldehyde and alcohol product having one more carbon atom than the parent olefin, also varying amounts of dimeric alcohol product, i. e., one having twice the number of carbon atoms of the monomeric alcohol. There is thus presented the possibility of preparing high molecular weight alcohols which normally are difficult to prepare by the alcohol synthesis reaction, from low molecular weight olefins which not only react readily in this process but also are available in large supply. In particular, zinc metal, powdered zinc, and zinc salts have shown this property of forming higher aldehydes and alcohols when included as reaction modifier in the first stage along with the cobalt carbonylation catalyst.

It has now been found that this reaction modifying characteristic is a function of the solubility of the zinc compound, not in the olefin feed, but in the aldehyde product formed in the first step. The fate of the components of the catalyst combination included with the feed to the first stage is quite different. Thus though both zinc and cobalt may be added to the feed as the oleate, and thus are soluble in the olefin, under the reaction conditions prevailing in the aldehyde synthesis reaction zone, the cobalt oleate reacts with the $H_2$ and CO to form the corresponding cobalt hydrocarbonyl, which is the active carbonylation catalyst, and which is soluble in the resulting aldehyde product. Zinc oleate, on the other hand, does not react with these reagents to form a carbonyl. Thus, while the zinc oleate is soluble in the olefinic hydrocarbon feed, it is not appreciably soluble in the aldehyde product. This lack of solubility results in decreased yields of dimer alcohols. Furthermore, the zinc remaining as oleate or other organic salt in the olefin feed may foul the reactor oven.

It has now been found that these problems can be overcome and increased yields of high molecular weight alcohols realized by employing as a reaction modifier certain organic complexes or zinc which are aldehyde soluble. In particular, it has been found that when as a zinc reaction modifier, there is added to the Oxo or carbonylation stage, a complex of zinc and an organic compound capable of forming inner complexes with metals by way of chelate ring formation, not only are excellent yields of the dimeric alcohol produced, substantially higher than with an equivalent amount of a high molecular weight organic zinc salt, but also glycols are formed in good yields. The high molecular weight alcohols have high utility as detergent intermediates, while the glycols find use as plasticizing components.

Suitable as reaction modifiers in accordance with the present invention are organic complexes of zinc, that are soluble in aldehydes. Thus, there may be employed the zinc complex of acetyl acetone, benzoyl acetone, o-hydroxy aldehydes, ethylacetoacetate, and kindred compounds. The amounts that may be employed are in the range of .05 to .5% by height Zn based on olefin feed.

The process of the present invention may be further illustrated by the following specific examples.

EXAMPLE I

Preparation of zinc acetylacetonate 8.14 grams (.1 mole) of ZnO was placed in a 500 ml. flask equipped with a reflux condenser. Forty grams of acetylacetone (.4 mole) in 500 ml. of benzene were added and the mixture refluxed for two hours. The resulting product was filtered, and on cooling the zinc acetyl acetonate separated out in the benzene layer as white crystals. They were filtered, washed twice with 200 ml. portions of benzene and allowed to dry. A yield of about 40% of white powdery crystals was obtained. The yield can be increased by evaporating the benzene solution almost to dryness on a steam bath and separating out the zinc complex.

EXAMPLE II

The zinc acetylacetonate prepared in accordance with the method set forth above was charged to an autoclave along with a heptene fraction, carbon monoxide, hydrogen, and a cobalt catalyst. The aldehyde product was hydrogenated to the corresponding alcohol. For comparison, equivalent amounts of zinc oleate were likewise employed as reaction modifiers.

| Catalyst | Anhydrous Cobalt Acetate, 0.2% | | | | |
|---|---|---|---|---|---|
| Cat. Modifier | Zn Acetyl Acetonate | Zn Oleate | Zn Acetyl Acetonate | Zn Oleate | Zn Acetyl Acetonate |
| Modified Conc., Percent | 0.2 | 0.2 | 0.5 | 0.5 | 0.05 |
| Temperature, °F | 350 | 350 | 350 | 350 | 350 |
| Syn gas pres., p. s. i. g | 3,000 | 3,000 | 3,000 | 3,000 | 3,000 |
| Product Distribution after Hydrogenation: | | | | | |
| Hydrocarbon | 12.3 | 8.2 | 11.2 | 12.4 | 10.1 |
| $C_8$ Alcohol | 31.0 | 28.2 | 22.6 | 29.0 | 42.0 |
| Intermediate | 6.4 | 6.7 | 5.9 | 4.3 | 4.4 |
| $C_{16}$ Alcohol | 32.4 | 37.4 | 35.6 | 32.1 | 30.6 |
| $C_{16}$ Glycol | 6.5 | 0 | 7.8 | 0 | 3.6 |
| Bottoms | 11.6 | 20.2 | 16.9 | 22.2 | 9.3 |

These results point out clearly the advantages to be derived from employing the aldehyde-soluble zinc complexes. Not only is there obtained a higher yield of dimeric product, but also this is obtained at the expense of bottoms. That is, the zinc salt forms more bottoms than the zinc complex. Also of significance is the fact that the zinc complex forms glycol product, not shown by the zinc salts at these concentrations.

The invention may be subject to many modifications obvious to those skilled in the art. Thus, under certain conditions it may be desirable to add the zinc complex in the feed to the aldehyde synthesis stage or after the aldehyde synthesis reaction has started, or even to the aldehyde synthesis reaction product, either before or after the cobalt has been removed and thereafter thermally treating said reaction product.

What is claimed is:

1. In the process wherein olefinic compounds having $n$ carbon atoms in the molecule are contacted at elevated temperatures and pressures in a reaction zone with CO, $H_2$ and a cobalt carbonylation catalyst to form an aldehyde product, and said aldehyde product hydrogenated to an alcohol product and a metal comprising promoter adapted to promote the formation of a final alcohol product having $2n+2$ carbon atoms is added to said reaction zone, the improvement which comprises adding said promoter to said reaction zone as zinc acetyl acetonate.

2. In the process wherein olefins having $n$ carbon atoms per molecule are contacted at elevated temperatures and pressures with CO, $H_2$, and a cobalt carbonylation catalyst in a carbonylation zone, and a reaction product containing cobalt compounds and aldehydes is withdrawn from said zone, freed of cobalt and hydrogenated to an alcohol product in a hydrogenation zone, the improvement which comprises contacting said reaction product with zinc acetyl acetonate prior to said hydrogenation reaction, whereby an alcohol product having $2n+2$ carbon atoms is produced in said hydrogenation zone.

3. The process of claim 2 wherein said modifier is added to said carbonylation zone.

4. The process of claim 2 wherein said reaction modifier is added to said reaction product withdrawn from said carbonylation zone and said product thereafter thermally treated.

5. The process of producing glycols having $2n+2$ carbon atoms from olefins having $n$ carbon atoms which comprises passing said olefins, CO, $H_2$, a cobalt catalyst and zinc acetyl acetonate into a carbonylation reaction zone, maintaining a pressure of about 2000–4500 p. s. i. g. and a temperature of about 275–375° F. in said zone, withdrawing an oxygenated organic reaction product from said zone, freeing said reaction products of cobalt and zinc contaminants, hydrogenating said reaction product, and recovering good yields of a glycol product.

References Cited in the file of this patent

UNITED STATES PATENTS

| | | |
|---|---|---|
| 2,500,210 | Schexnailder | Mar. 14, 1950 |
| 2,564,104 | Gresham et al. | Aug. 14, 1951 |

OTHER REFERENCES

Wender et al.: Bureau of Mines Report of Investigations No. 4270, 1948, pp. 1 and 3 to 10.

Karrer et al.: Organic Chemistry, Elsevier, N. Y., 1950; pp. 164, 170.